United States Patent
Brandner et al.

(10) Patent No.: US 10,936,447 B2
(45) Date of Patent: *Mar. 2, 2021

(54) RESYNCHRONIZING TO A FIRST STORAGE SYSTEM AFTER A FAILOVER TO A SECOND STORAGE SYSTEM MIRRORING THE FIRST STORAGE SYSTEM

(71) Applicant: INTERNATIONAL BUSINESS MACHINES CORPORATION, Armonk, NY (US)

(72) Inventors: Michael Brandner, Muenster (DE); Michael Frankenberg, Saerbeck (DE); Alan G. McClure, Sahuarita, AZ (US); David B. Petersen, Great Falls, VA (US); Daniel Roman, Saint Drezery (FR); Gail A. Spear, Tucson, AZ (US); John G. Thompson, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 132 days.

This patent is subject to a terminal disclaimer.

(21) Appl. No.: 16/128,435

(22) Filed: Sep. 11, 2018

(65) Prior Publication Data

US 2019/0012243 A1   Jan. 10, 2019

Related U.S. Application Data

(63) Continuation of application No. 14/704,893, filed on May 5, 2015, now Pat. No. 10,133,643.

(51) Int. Cl.
*G06F 11/20* (2006.01)
*G06F 11/16* (2006.01)

(52) U.S. Cl.
CPC ...... *G06F 11/1662* (2013.01); *G06F 11/2069* (2013.01); *G06F 11/2082* (2013.01);
(Continued)

(58) Field of Classification Search
CPC ............. G06F 11/1662; G06F 11/2082; G06F 11/2069; G06F 11/2094; G06F 11/2071; G06F 2201/805
(Continued)

(56) References Cited

U.S. PATENT DOCUMENTS 7,437,601 B1   10/2008   Manley et al.
7,627,729 B2   12/2009   Bartfai et al.
(Continued)

FOREIGN PATENT DOCUMENTS

JP   2000330731 A   11/2000
JP   2005352831 A   12/2005

OTHER PUBLICATIONS

CN Office Action dated Mar. 16, 2020, pp. 5, for application 201680025475.3, filed May 3, 2016.
(Continued)

*Primary Examiner* — Yair Leibovich
(74) *Attorney, Agent, or Firm* — David W. Victor; Konrad Raynes Davda & Victor LLP (57) ABSTRACT

Provided are a computer program product, system, and method for performing a failover between a first storage system and a second storage system. Data is synchronized between the first storage system and the second storage system. A failover is performed from the first storage system to the second storage system in response to a failover event at the first storage system while synchronizing the data. A determination is made that a first storage unit of the first storage system is inoperable and that that a second storage unit of the first storage system is operable in response to the
(Continued)

failover event. In response to determining that the second storage unit is operable, a resynchronization is initiated to copy updates to a second storage unit of the second storage system mirroring the second storage unit of the first storage system to the second storage unit of the first storage system.

21 Claims, 5 Drawing Sheets

(52) U.S. Cl.
CPC ...... *G06F 11/2094* (2013.01); *G06F 11/2071* (2013.01); *G06F 2201/805* (2013.01)

(58) Field of Classification Search
USPC .......................................................... 714/6.3
See application file for complete search history.

(56) References Cited

U.S. PATENT DOCUMENTS

| | | | | |
|---|---|---|---|---|
| 7,631,066 | B1* | 12/2009 | Schatz | G06F 9/5016 709/224 |
| 7,941,602 | B2 | 5/2011 | Burkey | |
| 8,020,037 | B1 | 9/2011 | Schwartz et al. | |
| 8,099,623 | B1* | 1/2012 | Li | G06F 11/1084 714/6.22 |
| 9,904,721 | B1 | 2/2018 | Holenstein et al. | |
| 10,133,643 | B2* | 11/2018 | Brandner | G06F 11/1662 |
| 2002/0112198 | A1 | 8/2002 | Lim et al. | |
| 2005/0071708 | A1 | 3/2005 | Bartfai et al. | |
| 2005/0097391 | A1 | 5/2005 | Boyd et al. | |
| 2006/0015764 | A1* | 1/2006 | Ocko | G06F 11/2028 714/4.12 |
| 2007/0288710 | A1 | 12/2007 | Boyd et al. | |
| 2008/0172572 | A1* | 7/2008 | Beardsley | G06F 11/2069 714/6.12 |
| 2013/0080559 | A1 | 3/2013 | Rao et al. | |
| 2014/0258659 | A1 | 9/2014 | Petersen et al. | |
| 2016/0048408 | A1 | 2/2016 | Madhu et al. | |
| 2016/0306717 | A1 | 10/2016 | Li et al. | |
| 2016/0306719 | A1* | 10/2016 | Laicher | G06F 11/1471 |
| 2016/0328303 | A1 | 11/2016 | Brandner et al. | |

OTHER PUBLICATIONS

Google English translation of CN Office Action dated Mar. 16, 2020, pp. 5, for application 201680025475.3, filed May 3, 2016.
JP Office Action dated Jan. 7, 2020, pp. 4, for application JP2017-553352, filed May 3, 2016.
English tranlsation of JP2000330731A, dated Nov. 30, 2000, pp. 6.
English tranlsation of JP2005352831A, dated Dec. 22, 2015, pp. 12.
Google English translation of JP Office Action dated Jan. 7, 2020, pp. 4, for application JP2017-553352, filed May 3, 2016.
PCT International Search Report and Written Opinion dated Sep. 8, 2016, pp. 11, for Application No. PCT/IB/2016/052502, filed May 3, 2016.
Examination Report dated Jan. 3, 2018, pp. 4, for Application GB1719444.0.
Reply dated Feb. 26, 2018, pp. 11, to Examination Report dated Jan. 3, 2018, pp. 4, for Application GB1719444.0.
IBM, "Method and Apparatus for Serialization of Data Access between Data Synchrononization and Runtime Operations", IP.com, IP.com No. 000166858, Jan. 25, 2008, pp. 5.
U.S. Appl. No. 14/704,893, filed May 5, 2015.
Office Action dated Nov. 30, 2016, pp. 15, for U.S. Appl. No. 14/704,893.
Response dated Feb. 28, 2016, pp. 11, to Office Action dated Nov. 30, 2016, pp. 15, for U.S. Appl. No. 14/704,893.
Office Action dated Jun. 16, 2017, pp. 10, for U.S. Appl. No. 14/704,893.
Response dated Sep. 18, 2017, pp. 11, to Office Action dated Jun. 16, 2017, pp. 10, for U.S. Appl. No. 14/704,893.
Office Action dated Dec. 22, 2017, pp. 15, for U.S. Appl. No. 14/704,893.
Response dated Mar. 22, 2018, pp. 15, to Office Action dated Dec. 22, 2017, pp. 15, for U.S. Appl. No. 14/704,893.
Notice of Allowance dated Jul. 22, 2018, pp. 15, for U.S. Appl. No. 14/704,893.
List of IBM Patents or Patent Applications Treated as Related, dated Sep. 11, 2018, pp. 2.
Global Dossier Translation of CN Office Action dated Mar. 16, 2020, pp. 5, for application 201680025475.3, filed May 3, 2016.

* cited by examiner

FIG. 1

Copy Relationship

FIG. 2

Point-in-Time Copy Command

FIG. 6

RESYNCHRONIZING TO A FIRST STORAGE SYSTEM AFTER A FAILOVER TO A SECOND STORAGE SYSTEM MIRRORING THE FIRST STORAGE SYSTEM

BACKGROUND OF THE INVENTION

1. Field of the Invention

The present invention relates to a computer program product, system, and method for resynchronizing to a first storage system after a failover to a second storage system mirroring the first storage system.

2. Description of the Related Art

In a storage environment, a storage controller may maintain mirror copy relationships, where a primary volume in a mirror copy relationship comprises the storage or volumes from which data is physically copied to a secondary or volume. Failover programs, such as International Business Machine Corporation's ("IBM") HyperSwap® which is a function in the z/OS® operating system, provides continuous availability for disk failures by maintaining the mirror copy relationships to provide synchronous copies of all primary disk volumes on one or more primary storage systems to one or more target (or secondary) storage systems. (HyperSwap is a registered trademark of IBM in countries throughout the world). When a disk failure is detected, code in the operating system identifies HyperSwap managed volumes and instead of failing the I/O request, HyperSwap switches (or swaps) information in internal control blocks so that the I/O request is driven against the secondary volume of the mirror copy relationship. The failover is performed very quickly and involves only a very minor impact to the host applications. Host applications are not notified of the primary disk failure and are unaware that their access has been swapped to the secondary copy of the data. Since the secondary volume is an identical copy of the primary volume prior to the failure, the I/O request will succeed with no impact to the program issuing the I/O request, which could be an application program or part of the operating system. This therefore masks the disk failure from the program and avoids an application and/or system outage.

When a primary disk failure occurs, the failover function automatically swaps the access of the host systems from the failing primary disk control unit to the secondary control unit, which contains the secondary copy of data. After a failover occurs, mirroring between the two storage system pairs is suspended, which means updates that are being made by the applications to the current primary copy are not being mirrored to the secondary copy. While in this suspended state, another failover operation is not possible. This leaves the customer exposed to another failure of any kind that affects the only good copy of data that is remaining.

In the current art, to return the primary and secondary volumes to a failover enabled state, an administrator or user collects and analyzes diagnostic information from the failed primary storage system and makes repairs if necessary. The administrator/user may then initiate resynchronization of data from the current secondary site back to the primary storage that experienced the failover. The administrator/user may perform the resynchronization operation by initiating point-in-time ("PiT") copies of the primary storage devices to provide a consistent copy of the data. Until the resynchronization is complete, the primary storage system devices will not be consistent and therefore, not useful for recovery. The point-in-time copy protects against a secondary storage system failure that occurs during a resynchronization If data loss has occurred for any of the primary storage devices (as a result of the failure), the failed devices are resynchronized by performing a full copy from the secondary storage system devices corresponding to the failed primary storage system devices. For primary storage system devices which did not experience data loss, only updated tracks at the secondary storage system are copied back to the primary storage system during the resynchronization. When the resynchronization operation completes, the mirroring pairs are once again back in synchronization with each other.

The administrator/user managed resynchronization process can take many hours or even days. Until the process completes, the customer is exposed to a second failure.

SUMMARY

Provided are a computer program product, system, and method for performing a failover between a first storage system and a second storage system. Data is synchronized between the first storage system and the second storage system. A failover is performed from the first storage system to the second storage system in response to a failover event at the first storage system while synchronizing the data, wherein Input/Output (I/O) requests to the first storage system are redirected to the second storage system as part of the failover. A determination is made that a first storage unit of the first storage system is inoperable in response to the failover event and that that a second storage unit of the first storage system is operable in response to the failover event. In response to determining that the second storage unit is operable, a resynchronization is initiated to copy updates to a second storage unit of the second storage system mirroring the second storage unit of the first storage system to the second storage unit of the first storage system while I/O requests are being redirected to the second storage system.

By having the secondary replication manager automatically asynchronously copying updates at the second storage units to those operable first storage units as part of the resynchronization during the failover to the second storage system, the data at the first storage units is kept as up-to-date as possible so that the resynchronization of the first storage system may complete faster once the first storage system is repaired and fully operable.

In further embodiments, the synchronization of the data between the first storage system and the second storage system are performed in synchronous copy mode and the copying of the updates during the resynchronization while I/O requests are being redirected to the second storage system are performed in asynchronous copy mode.

In still further embodiments, determining that the first storage unit is inoperable comprises initiating a point-in-time copy of the first storage unit of the first storage system and determining that the point-in-time copy of the first storage unit failed. The first storage unit is determined to be inoperable in response to determining that the point-in-time copy of the first storage unit failed. Further, determining that the second storage unit is operable comprises initiating a point-in-time copy of the second storage unit of the first storage system and determining that the point-in-time copy of the second storage unit succeeded, wherein the second storage unit is determined to be operable in response to determining that the point-in-time copy of the second storage unit succeeded.

Taking the point-in-time copy of the operable second storage unit maintains a copy of accessible data in the first storage system In still further embodiments, a soft fence state is established for the first storage system to prevent I/O access to the storage units at the first storage system in response to the failover event, wherein the point-in-time copies are initiated with a command having a parameter to allow the point-in-time copy operations to proceed during the soft fence state of the first storage system.

In yet further embodiments, the resynchronization comprises a first resynchronization, and health query is issued to the first storage system to determine whether the first storage system is fully operable. Both the first and second storage units of the first storage system are operable when the first storage system is fully operable. Updates to the first storage unit of the second storage system are resynchronized to the first storage unit of the first storage system in response to determining that the response to the health query indicates the first storage system is fully operable.

In yet further embodiments, the first storage units comprise first volumes of the first and second storage systems and the second storage units comprise second volumes of the first and second storage systems. The first volume determined to be inoperable includes a subset of tracks experiencing data loss. The resynchronization further performs in response to the health query indicating that the first storage system is fully operable copying a subset of tracks in the first volume of the second storage system to the corresponding subset of tracks in the first volume in the first storage system. Tracks in the first volume in the first storage system not experiencing data loss and not corresponding to tracks in the first volume in the second storage system that are updated while I/O requests are being redirected to the second storage system are not subject to the resynchronization.

After the repair and recovery, only tracks in the recovered inoperable first volume that were updated during the failover or that experienced data loss, need to be synchronized. Further, by starting resynchronizing during the failover for volumes that are operable, the synchronization after the first storage system is recovered completes much faster because much of the data may have already been resynchronized In further embodiments, the resynchronization of the second storage unit of the second storage system to the first storage system prior to the response to the health query indicating the first storage system is fully operable is performed in asynchronous copy mode. The resynchronization of the second storage unit of the second storage system to the first storage system is transitioned to the synchronous copy mode in response to the query indicating that the first storage system is fully operable.

DETAILED DESCRIPTION

Described embodiments provide techniques for resynchronizing data in the event of a failover from a primary storage system to a secondary storage system. In response to the failover, for those primary volumes or storage units that are operable, updates to the corresponding secondary volumes are resynchronized to the operable primary volumes before the primary storage system has recovered. For those primary storage system volumes that are inoperable or experiencing data loss, updates to the corresponding secondary volumes are indicated, such as in a change recording bitmap, and then resynchronized back to the primary volumes after the primary storage system has recovered or been repaired.

With described embodiments, data immediately begins automatic program controlled resynchronization back to operable volumes of the failed primary storage system to minimize the time required to make the primary storage system fully synchronized and available to handle a second failover at the secondary storage system. In this way, after the primary storage system is recovered, as much operable primary volumes have already been resynchronized according to an automated resynchronization process, thus reducing the time to resynchronize after the primary storage system is recovered.

Figure 1:
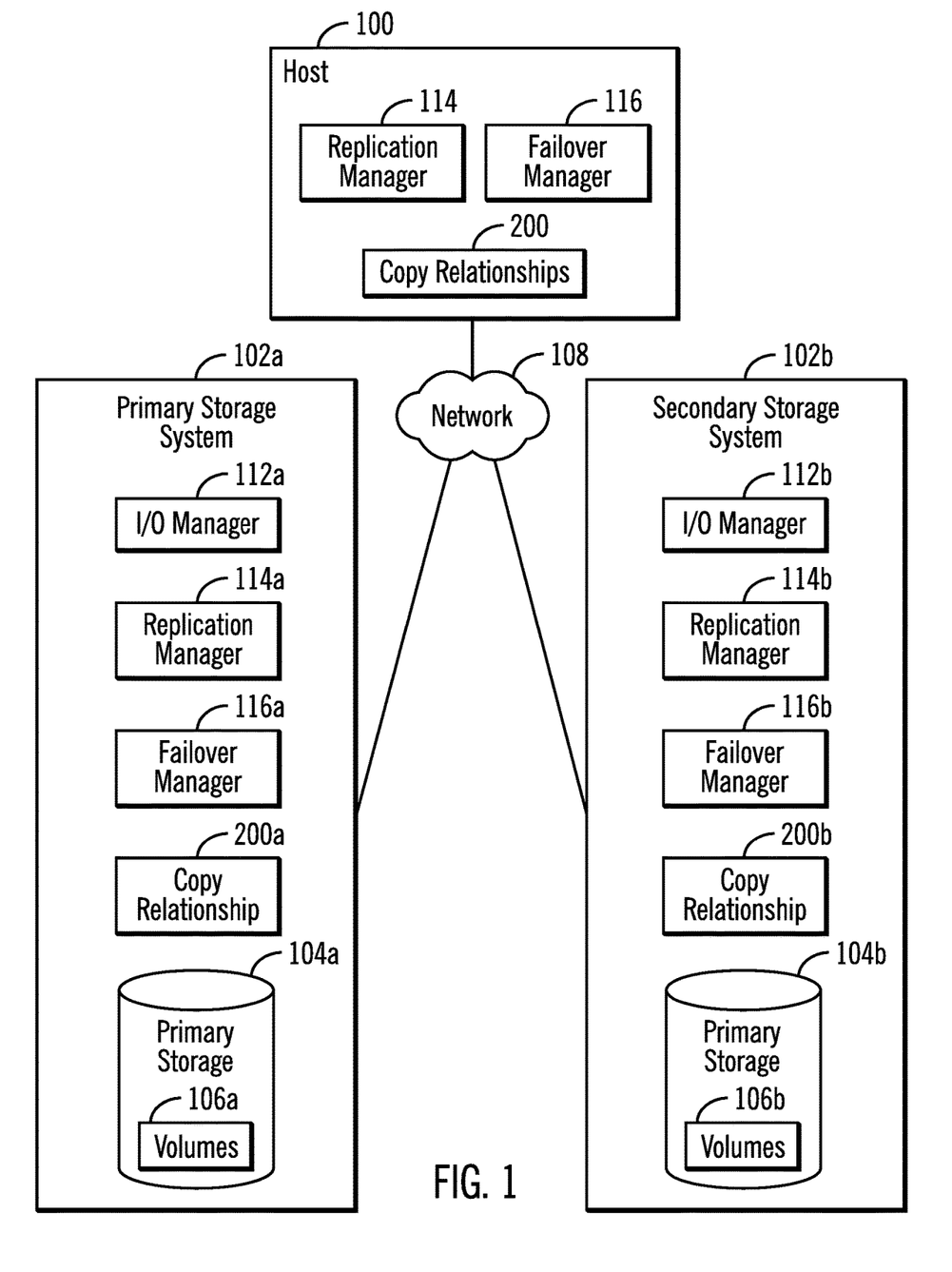
FIG. 1 illustrates an embodiment of a storage replication environment.

FIG. 1 illustrates an embodiment of a data mirroring and failover environment having a host system 100 that is connected to a primary storage system 102a and a secondary storage system 102b. The primary storage system 102a includes a primary storage 104a having volumes 106a mirrored to corresponding volumes 106b in the secondary storage system 102b in a mirroring pair or copy relationship. The host 100 and storage systems 102a and 102b may communicate over a network 108. There may be additional hosts (not shown) that provide Input/Output (I/O) requests to the primary 106a and secondary 106b volumes.

The primary 102a and secondary 102b storage systems include Input/Output (I/O) managers 112a, 112b to manage I/O operations directed to the primary 106a and secondary 106b volumes, respectively. The host system 100 includes a replication manager 114 to establish mirror copy relationships 200 between the different volumes 106a, 106b. The storage systems 102a, 102b include replication managers 114a, 114b to manage the replication or mirroring of data between the primary 106a and secondary 106b volumes, and coordinate replication with the host replication manager 114.

The host 100 includes a failover manager 116 to manage the failover of I/O operations from the primary storage system 102a to the secondary storage system 102b in response to a failover event, such as a storage or component failure at the primary storage system 102a, and to manage failover from the secondary storage system 102b to the primary storage system 102a when the secondary storage system 102b is managing I/O operations and experiences an error. The primary 102a and secondary 102b storage systems include failover managers 116a, 116b, respectively, to implement the failover operations in coordination with the host failover manager 116.

The primary 102a and secondary 102b storage systems maintain information on the copy relationships 200a, 200b established by the host replication manager 114. While the primary storage system 102a is functioning and managing I/O operations directed to the volumes 106a, copy relationships 200, 200a, 200b indicate that data is being mirrored or synchronized from the primary volumes 106a to the corresponding secondary volumes 106a. In one embodiment, the data form the primary volumes 106a may be mirrored as a consistency group where data is copied to the corresponding secondary volumes 106b in synchronous copy mode, where the write does not complete until the write is confirmed as stored at the secondary storage 104b.

In response to a failover event, the failover managers 116, 116a, 116b coordinate the failover to the secondary storage system 102b where the secondary storage system 102b takes over managing I/O requests to the secondary volumes 106b which have data replicated from the primary volumes 106a. After the failover, the host replication manager 114 may create copy relationships 200b at the secondary storage system 102b to resynchronize updates to the secondary volumes 106b back to the primary volumes 106a. Thus, while the production site has moved to the secondary storage 104b, the secondary replication manager 114b resynchronizes updates to secondary volumes 106b that correspond to operable primary volumes 106a at the primary storage system 102a.

In one embodiment, the copy relationships 200 are created by the host replication manager 114 and provided to the primary 102a and secondary 102b storage systems as local copies of the copy relationships 200a, 200b. In this way the host 100 manages the replication, failover and resynchronize operations of the primary 102a and secondary 102b storage systems. In an alternative embodiment, the primary storage system 102a and secondary storage system 102b may manage replication and failover themselves without participation of the host 100.

The storage systems 102a and 102b may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world). In one embodiment, the replication managers 114, 114a, 114b comprise programs for managing the mirroring of volumes across systems, such as, but not limited to, the IBM mirroring programs Geographically Dispersed Parallel Sysplex® (GDPS)®, and Tivoli® Storage Productivity Center for Replication (TPC-R) that define a replication session and copy pairs 200. Different types of techniques may be selected to copy the data, such as synchronous mirroring, asynchronous mirroring or point-in-time copying, or combinations of multiple of these different mirroring types. The failover managers 116, 116a, 116b may comprise a program suitable for handling the failover from one of storage systems 102a, 102b to the other, such as, but not limited to, the IBM HyperSwap product which establishes failover sessions from the established copy pairs. (Geographically Dispersed Parallel Sysplex, GDPS, Tivoli, and HyperSwap are registered trademarks of IBM in countries throughout the world).

The network 108 may comprise a Storage Area Network (SAN), Local Area Network (LAN), Intranet, the Internet, Wide Area Network (WAN), peer-to-peer network, wireless network, arbitrated loop network, etc. The storages 104a, 104b may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as node groups, managed components, mailboxes, etc., are shown, there may be any number of these components.

Figure 2:
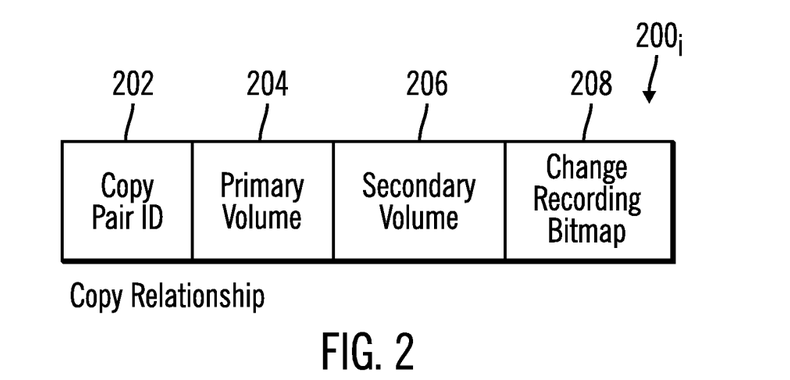
FIG. 2 illustrates an embodiment of a copy relationship.

FIG. 2 illustrates an embodiment of an instance of a copy relationship $200_i$, which may comprise an instance of the copy relationships 200, 200a, 200b, as including a copy pair identifier (ID) 202; a primary volume 204 from which data is copied (which may comprise one of the volumes 106a or 106b); a secondary volume 206 to which data is mirrored (which may comprise one of the volumes 106a or 106b); and a change recording bitmap 208 indicating data units or tracks in the primary volume 204 that need to copied or synchronized to the secondary volume 206. When all updates indicated in the change recording bitmap 208 are copied to the secondary volume 206, the copy relationship 200, reaches a duplex or synchronized state. The change recording bitmap 208 may be initialized to indicate that no tracks need to be synchronized. As tracks are updated, the corresponding bit in the bitmap 208 is set to indicate that track needs to be copied to the secondary volume 206.

Figure 3:
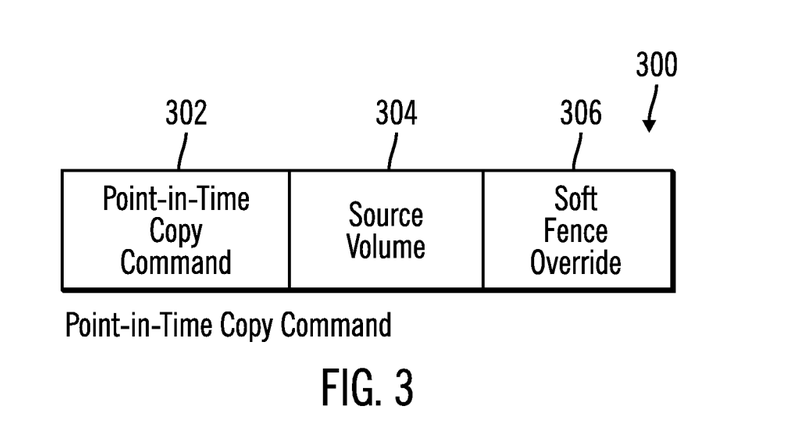
FIG. 3 illustrates an embodiment of a point-in-time copy command.

FIG. 3 illustrates an embodiment of a point-in-time copy command 300 including the point-in-time copy 302 command operator, a source volume 304 subject to the PiT copy operation; and a soft fence override 306 which instructs the I/O manager 112a, 112b to allow the PiT copy command to proceed even if the source volume 304 is fenced-off from I/O operations. A source volume 304 may be subject to being fenced-off if there is a failover at the source volume 304 to the corresponding volume at another storage system. A fenced-off state blocks reads and writes to the volumes 304 subject to the state. The parameter 306 allows the point-in-time copy command to proceed even if the source volume 304 is subject to the fenced-off state. If the parameter 306 does not indicate to allow the point-in-time command to proceed when the volume 304 is in the fenced-off state, then the point-in-time command may be blocked by the fenced-off state.

A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

Figure 4:
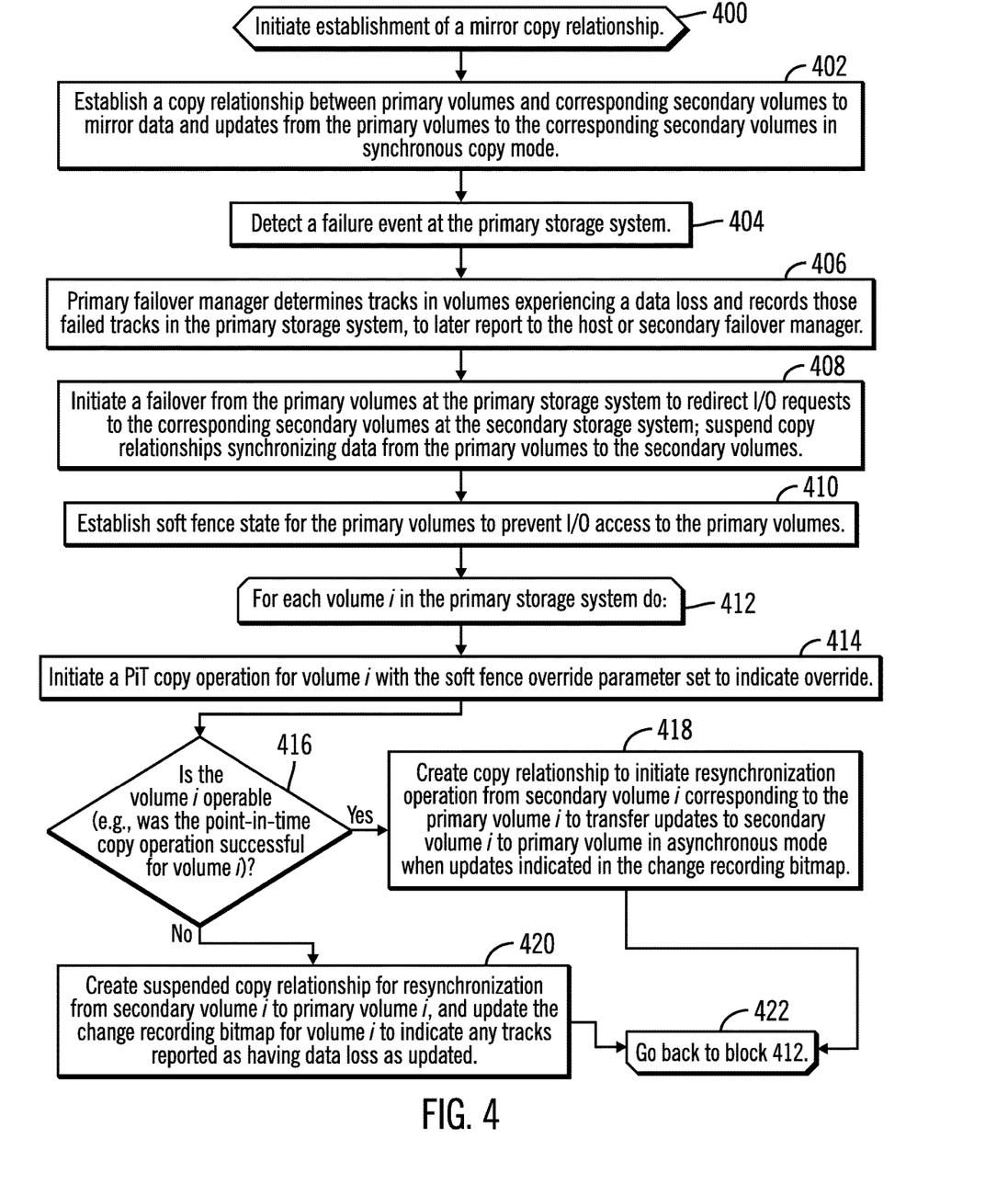
FIG. 4 illustrates an embodiment of operations to perform a failover operation.

FIG. 4 illustrates an embodiment of operations performed by the components in the host 100, primary storage system 102a, and secondary storage system 102b components to perform a failover from the primary storage system 102a to the secondary storage system 102b. The system 102b may function as the primary storage system and the system 102a may function as the secondary storage system for failover. Control begins with the host replication manager 114 initiating (at block 400) mirror copy operations to synchronize data between the primary volumes 106a and secondary volumes 106b. The host replication manager 114 may establish (at block 402) a copy relationship 200 between primary storage volumes 106a and corresponding secondary storage volumes 106b to mirror data and updates from the primary volumes 106a to the corresponding secondary volumes 106b in synchronous copy mode. The copy relationships 200 are provided to the primary replication manager 114a to use to mirror/synchronize the data. In synchronous copy mode, data copied is not indicated as completed until the secondary storage system 102a confirms that the data has been stored in the corresponding secondary volumes 106b. In one embodiment, the data may be mirrored from the primary volumes 106a to the secondary volumes 106b in consistency group mode such that data at the secondary volumes 106b is maintained consistent as of a point-in-time with the data at the primary volumes 106a.

The failover manager 116a may detect (at block 404) a failure event at the primary storage system 102a, such as a failure of one or more components of the primary storage system 102a, including storage devices of the primary storage 104a. Upon detecting (at block 404) the failover event, the primary failover manager 116a or host failover manager 116a may determine (at block 406) tracks in primary volumes 106a experiencing a data loss and record those failed tracks in the primary storage system 102a. The primary storage system 102a may subsequently report the information on the failed tracks to the host 116 or secondary 116b failover manager for use during the resynchronization from the secondary storage system 102b back to the primary storage system 102a. The tracks in the inoperable primary volumes 106a may comprise a subset of tracks in the volumes, where other tracks may not be experiencing data loss.

The host failover manager 116 may then coordinate with the primary 116a and secondary 116b failover managers to initiate (at block 408) a failover from the primary volumes 106a at the primary storage system 102a to redirect I/O requests to the corresponding secondary volumes 106b at the secondary storage system 102b. As part of the failover, the host replication manager 114 may suspend copy relationships 200a synchronizing data from the primary volumes 106a to the secondary volumes 106b. The host failover manager 116 may further establish (at block 410) a soft fence state for the primary volumes 106a. The soft fence state prevents I/O operations against the one or more primary volumes 106a that were swapped to the secondary volumes 106b to prevent any unintended access to those volumes 106a following the failover.

The host replication manager 114 or failover manager 116 may then perform a loop of operations at blocks 412 through 422 for each primary volume i in the primary storage system 102a. For primary volume i, the host replication manager 114 or failover manager 116 may initiate (at block 414) a PiT copy operation for volume i with the soft fence override parameter 306 set to indicate that the PiT copy operation should continue even if a soft fence state is active for volume i. The host replication manager 114 or failover manager 116 determines (at block 416) whether volume i is operable. In one embodiment, this determination may made by initiating a point-in-time copy command 300 having the soft-fence override parameter 306 set specifying to allow the point-in-time command 300 to proceed if the volume i is subject to the soft fence state, which would be the case as a result of the operation at block 406. If the point-in-time copy operation succeeds with respect to volume i, then volume i is determined to be operable, else if the point-in-time copy operation fails, the volume i is determined to be inoperable. By taking point-in-time copies of operable primary volumes 106a, the data for these primary volumes 106a is preserved as of the point-in-time of the failover event. These point-in-time copies may be used for data recovery if other recovery options fail. Other techniques may be used to determine whether the primary volumes 106a, are operable as part of the operation at block 414.

If (at block 416) primary volume i is operable, then the host replication manager 114 (or failover manager 116) creates (at block 418) a copy relationship 200, to initiate resynchronization operations from the secondary volume i at the secondary storage 102b corresponding to the primary volume i to transfer updates to secondary volume i to the primary volume i in asynchronous copy mode for updates indicated in the change recording bitmap. When an update to the secondary volume 106b is received, the corresponding bit in the change recording bitmap 208 for the secondary volume i is set. The secondary replication manager 114b scans through the change recording bitmaps 208 looking for updates at the secondary volumes 106b to resynchronize or copy to the corresponding primary volumes 106a that remain operable during the failover. In asynchronous copy mode, the copy completes without having to receive confirmation from the primary volume i that the data was received. In one embodiment, the asynchronous mode may comprise a non-consistency group mode (CGM) such that the data is not assured to be consistent between the secondary 106b and primary 106a volumes. By having the secondary replication manager 114 automatically asynchronously copying updates at the secondary volumes 106b to those operable primary volumes 106a as part of the resynchronization during the failover to the secondary storage system 102b, the data at the primary volumes 106a is kept as up-to-date as possible so that the resynchronization of the primary storage system 102a may complete faster once the primary storage system 102a is repaired and fully operable. With the described embodiments, the resynchronization back to the operable volumes is initiated automatically by the failover process controlled by the failover manager 116 or 116b.

Further, performing the resynchronization copying asynchronously significantly reduces the performance impact to host applications accessing the secondary volumes as compared to performing the copying synchronously. Further, the asynchronous copying may be initiated immediately after the failover, before any failure analysis and equipment repairs (if necessary) are performed If (at block 416) volume i is not operable, then the host replication 114 or failover 116 manager creates (at block 420) a suspended copy relationship 200, for resynchronization from the secondary volume i to primary volume i, and updates the change recording bitmap 208 for volume i to indicate any tracks reported as having data loss as updated. Indicating the tracks in volume i experiencing data loss as updated in the change recording bitmap 208 will cause the secondary replication manager 114b to copy over the data for the tracks having data loss, whether they have been updated or not during the failover, during a subsequent resynchronization after the volume i is repaired and operable The result of the operations of FIG. 4 is that after the failover, the secondary storage system 102b immediately begins resynchronizing updates to the secondary volumes 106b to the primary volumes 106a that remain operable. For primary volumes 106a that are inoperable, the change recording bitmap 208 for the corresponding secondary volume 106b is set to indicate the tracks experiencing data loss as updated, and resynchronization is suspended until the inoperable primary volumes are determined to be operable. By resynchronizing those primary volumes that are operable during the failover, the primary storage system will be ready for failover sooner after the primary storage system 102a becomes fully operable because a substantial amount of the updates at the secondary storage system 102b may have already been resynchronized to the primary volumes 106a during the failover at the secondary storage system 102b.

In the operations of FIG. 4, operability is determined with respect to volumes of a storage system. In alternative embodiments, the mirroring and operability may be determined with respect to storage units other than volumes, such as storage devices, logical partitions, physical partitions, logical drives, etc.

Figure 5:
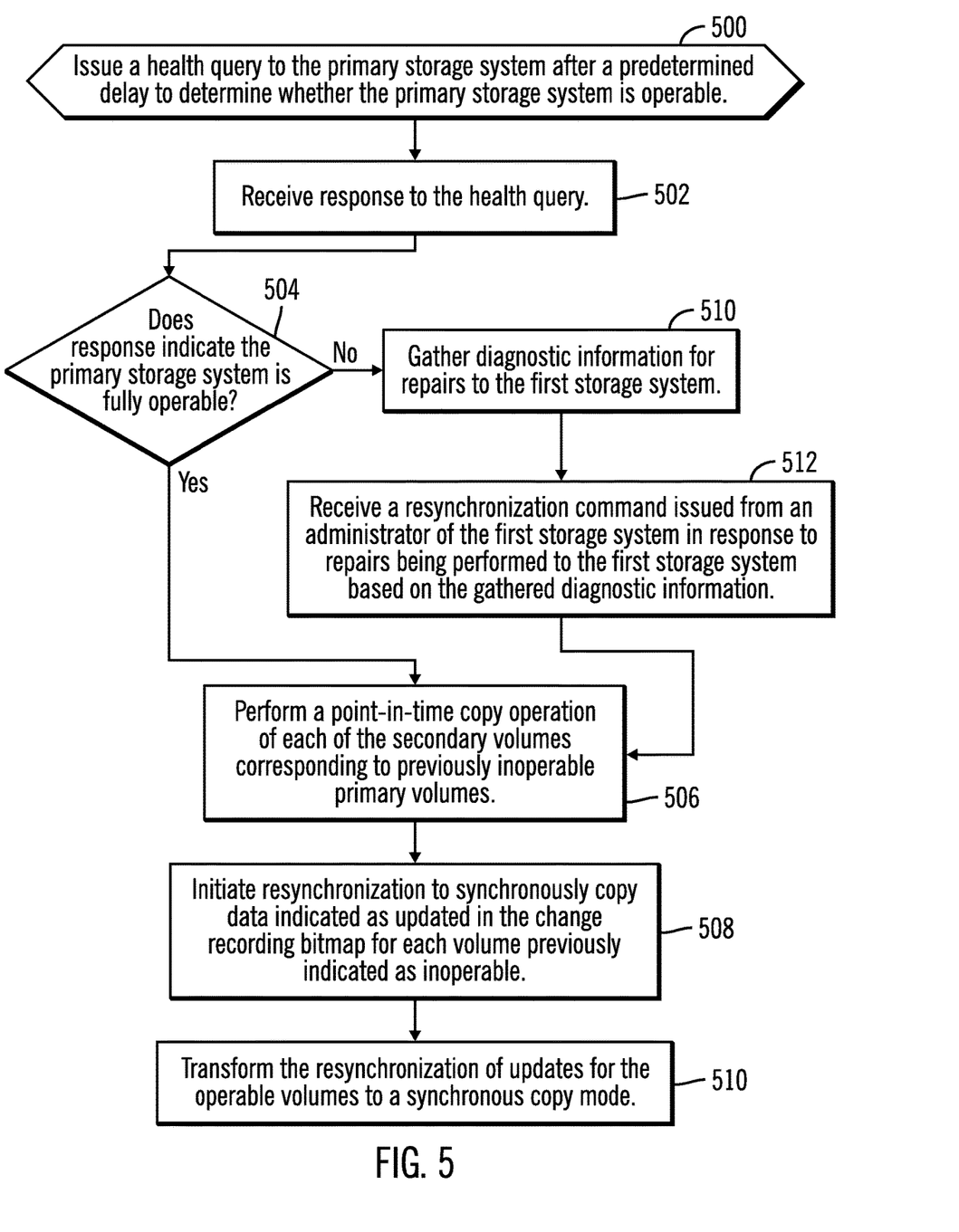
FIG. 5 illustrates an embodiment of operations to resynchronize back to the recovered primary storage system.

FIG. 5 illustrates an embodiment of operations performed by the host replication manager 114 and failover manager 116 to recover the primary storage system 102a after the failure event. The host failover manager 114 issues (at block 500) a health query to the primary storage system 102a after a predetermined delay from the failover to determine whether the primary storage system 102a is operable. For many failure types, after a certain time has elapsed, the primary storage system 102a may have recovered through internal recovery operations and procedures. Upon receiving (at block 502) the response to the health query from the primary storage system 102a, if (at block 504) the response indicates that the primary storage system 102a is fully operable, then the host replication manager 114 may perform (at block 506) a point-in-time copy operation of each of the secondary volumes 106b corresponding to a previously inoperable primary volume 106a to provide a consistent copy that may be used for recovery if needed. The host replication manager 114 initiates (at block 508) resynchronization to synchronously copy data indicated as updated in the change recording bitmap 208 for each secondary volume 106b corresponding to a primary volume 106a previously indicated as inoperable. The resynchronization may be initiated by unsuspending the copy relationship 200b to resynchronize the secondary volume to the previously inoperable primary volume 106a. The change recording bitmap 208 for the resynchronization to the previously inoperable primary volume 106a indicates as updated tracks in the corresponding secondary volume 106b that were updated and tracks in the inoperable primary volume that were reported as experiencing data loss. In this way, the resynchronization for the recovered inoperable primary volumes 106a only copies updated data and data for tracks experiencing data loss, and does not copy over the entire recovered inoperable volume. This expedites resynchronization by avoiding copying tracks in the secondary volume that correspond to tracks in the recovered primary volume 106a that were not updated during the failover and that did not experience data loss.

The secondary replication manager 114b further transforms (at block 510) the resynchronization of updates for the operable volumes, that have been copied asynchronously since the start of the failover while I/O requests are redirected to the secondary storage system 102b, to a synchronous copy mode so that after the primary storage system 102a is recovered, the remaining data to resynchronize is copied synchronously.

If (at block 504) the response to the health query indicates that the primary storage system 102a is not fully operable, then the host failover manager 114 gathers (at block 510) diagnostic information for repairs to the primary storage system 102a to report to an administrator. The administrator may then proceed to repair the failed primary storage system 102 based on the gathered diagnostic information, such as by replacing and/or repairing units, components and storage devices in the primary storage system 102a. After completing repairs, the administrator may initiate a resynchronization command to perform resynchronization. At block 512, the host replication manager 114 or secondary replication manager 114b may receive the manual resynchronization command from the administrator and then proceed to block 506 to initiate resynchronization for the volumes previously indicated as inoperable.

With the described embodiments, after the repair and recovery, only tracks in the recovered inoperable primary volume 106a that were updated during the failover or that experienced data loss, which are indicated in the change recording bitmap for the copy relationship 200 established for failed volume 106a, needs to be synchronized. Further, by starting resynchronizing during the failover for primary volumes 106a that are operable, the synchronization after the primary storage system 102a is recovered completes much faster as much of the data may have already been resynchronized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or storage unit of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
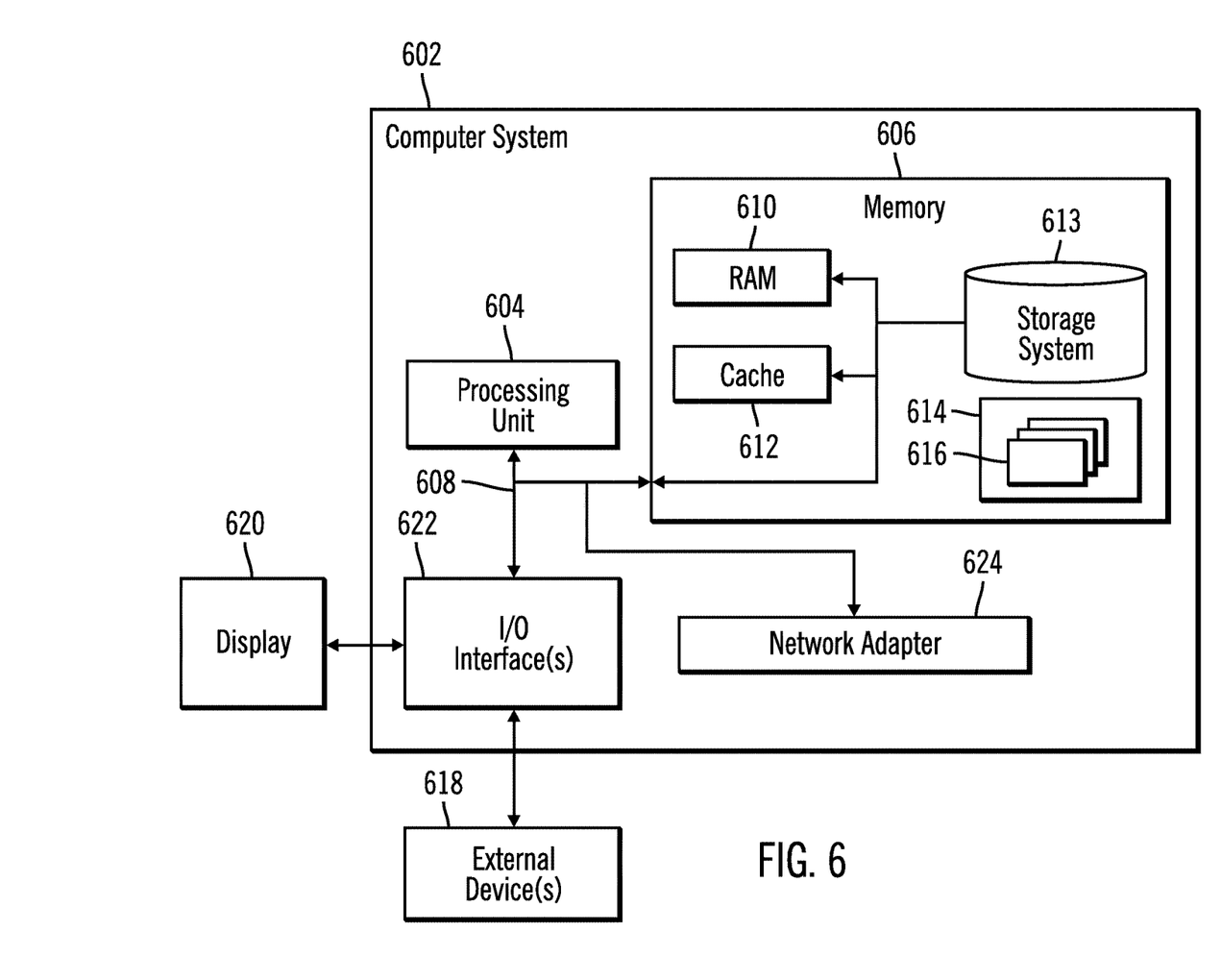
FIG. 6 illustrates a computing environment in which the components of FIG. 1 may be implemented.

The computational components of FIG. 1, including the hosts 100 and storage systems 102*a*, 102*b*, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices. For instance, in a cloud computing environment, the storage systems 102*a*, 102*b* may comprise cloud computing nodes providing storage services as a cloud based service.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The reference characters used herein, such as i, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing a failover between a first storage system and a second storage system, wherein the computer program product comprises a computer readable storage medium having program instructions embodied therewith, the program instructions executable by a processor to cause operations, the operations comprising:
   synchronizing data between the first storage system and the second storage system;
   performing a failover from the first storage system to the second storage system in response to a failover event at the first storage system while synchronizing the data, wherein Input/Output (I/O) requests to the first storage system are redirected to the second storage system as part of the failover, wherein the second storage system includes a first storage unit and a second storage unit that correspond to a first storage unit and a second storage unit in the first storage system, respectively; and
   in response to determining during the failover that the second storage unit in the first storage system is operable while the first storage unit in the first storage system is inoperable, initiating a resynchronization to copy updates from the second storage unit of the second storage system, mirroring the second storage unit of the first storage system, to the second storage unit of the first storage system, while I/O requests are being redirected to the second storage system.

2. The computer program product of claim 1, wherein the synchronization of the data between the first storage system and the second storage system are performed in synchronous copy mode and wherein the copying of the updates during the resynchronization while I/O requests are being redirected to the second storage system are performed in asynchronous copy mode.

3. The computer program product of claim 1,
wherein the determining that the first storage unit is inoperable comprises:
initiating a point-in-time copy of the first storage unit of the first storage system; and
determining that the point-in-time copy of the first storage unit failed, wherein the first storage unit is determined to be inoperable in response to determining that the point-in-time copy of the first storage unit failed;
wherein the determining that the second storage unit is operable comprising:
initiating a point-in-time copy of the second storage unit of the first storage system; and
determining that the point-in-time copy of the second storage unit succeeded, wherein the second storage unit is determined to be operable in response to determining that the point-in-time copy of the second storage unit succeeded.

4. The computer program product of claim 3, wherein the operations further comprise:
initiating a soft fence state for the first storage system to prevent I/O access to the first and the second storage units at the first storage system in response to the failover event, wherein point-in-time copies are initiated with a command having a parameter to allow point-in-time copy operations to proceed during the soft fence state of the first storage system.

5. The computer program product of claim 3, wherein the first storage units comprise first volumes of the first and second storage systems and wherein the second storage units comprise second volumes of the first and second storage systems.

6. The computer program product of claim 1, wherein the resynchronization comprises a first resynchronization, wherein the operations further comprise:
issuing a health query to the first storage system to determine whether the first storage system is fully operable, wherein both the first and second storage units of the first storage system are operable when the first storage system is fully operable; and
initiating a second resynchronization to copy updates to the first storage unit of the second storage system to the first storage unit of the first storage system in response to determining that the response to the health query indicates the first storage system is fully operable.

7. The computer program product of claim 6, wherein the first storage units comprise first volumes of the first and second storage systems and wherein the second storage units comprise second volumes of the first and second storage systems, wherein the first volume determined to be inoperable includes a subset of tracks experiencing data loss, wherein the second resynchronization further performs in response to the health query indicating that the first storage system is fully operable:
copying a subset of tracks in the first volume of the second storage system to a corresponding subset of tracks in the first volume in the first storage system, wherein tracks in the first volume in the first storage system not experiencing data loss and not corresponding to tracks in the first volume in the second storage system that are updated while I/O requests are being redirected to the second storage system are not subject to the second resynchronization.

8. The computer program product of claim 6, wherein the operations further comprise:
gathering diagnostic information for repairs to the first storage system in response to the health query indicating that the first storage system is not fully operable; and
receiving a resynchronization command issued from an administrator of the first storage system in response to repairs being performed to the first storage system based on the gathered diagnostic information, wherein the received resynchronization command initiates the copying of updates to the first storage unit of the second storage system to the first storage unit of the first storage system.

9. The computer program product of claim 1, wherein updates to a first storage unit of the second storage system mirroring the first storage unit of the first storage system are not copied to the first storage unit of the first storage system while I/O requests are being redirected to the second storage system.

10. A system for performing a failover between a first storage system and a second storage system, comprising:
at least one processor; and
a computer readable storage medium having program instructions executed by the at least one processor to perform operations, the operations comprising:
synchronizing data between the first storage system and the second storage system;
performing a failover from the first storage system to the second storage system in response to a failover event at the first storage system while synchronizing the data, wherein Input/Output (I/O) requests to the first storage system are redirected to the second storage system as part of the failover, wherein the second storage system includes a first storage unit and a second storage unit that correspond to a first storage unit and a second storage unit in the first storage system, respectively; and
in response to determining during the failover that the second storage unit is operable in the first storage system while the first storage unit in the first storage system is inoperable, initiating a resynchronization to copy updates from the second storage unit of the second storage system, mirroring the second storage unit of the first storage system, to the second storage unit of the first storage system, while I/O requests are being redirected to the second storage system.

11. The system of claim 10, wherein the synchronization of the data between the first storage system and the second storage system are performed in synchronous copy mode and wherein the copying of the updates during the resynchronization while I/O requests are being redirected to the second storage system are performed in asynchronous copy mode.

12. The system of claim 10,
wherein the determining that the first storage unit is inoperable comprises:
initiating a point-in-time copy of the first storage unit of the first storage system; and
determining that the point-in-time copy of the first storage unit failed, wherein the first storage unit is determined to be inoperable in response to determining that the point-in-time copy of the first storage unit failed;

wherein the determining that the second storage unit is operable comprising:
  initiating a point-in-time copy of the second storage unit of the first storage system; and
  determining that the point-in-time copy of the second storage unit succeeded, wherein the second storage unit is determined to be operable in response to determining that the point-in-time copy of the second storage unit succeeded.

13. The system of claim 12, wherein the operations further comprise:
  initiating a soft fence state for the first storage system to prevent I/O access to the first and the second storage units at the first storage system in response to the failover event, wherein point-in-time copies are initiated with a command having a parameter to allow point-in-time copy operations to proceed during the soft fence state of the first storage system.

14. The system of claim 10, wherein the resynchronization comprises a first resynchronization, wherein the operations further comprise:
  issuing a health query to the first storage system to determine whether the first storage system is fully operable, wherein both the first and second storage units of the first storage system are operable when the first storage system is fully operable; and
  initiating a second resynchronization to copy updates to the first storage unit of the second storage system to the first storage unit of the first storage system in response to determining that the response to the health query indicates the first storage system is fully operable.

15. The system of claim 14, wherein the first storage units comprise first volumes of the first and second storage systems and wherein the second storage units comprise second volumes of the first and second storage systems, wherein the first volume determined to be inoperable includes a subset of tracks experiencing data loss, wherein the resynchronization further performs in response to the health query indicating that the first storage system is fully operable:
  copying a subset of tracks in the first volume of the second storage system to a corresponding subset of tracks in the first volume in the first storage system, wherein tracks in the first volume in the first storage system not experiencing data loss and not corresponding to tracks in the first volume in the second storage system that are updated while I/O requests are being redirected to the second storage system are not subject to the second resynchronization.

16. A method for performing a failover between a first storage system and a second storage system, comprising:
  synchronizing data between the first storage system and the second storage system;
  performing a failover from the first storage system to the second storage system in response to a failover event at the first storage system while synchronizing the data, wherein Input/Output (I/O) requests to the first storage system are redirected to the second storage system as part of the failover, wherein the second storage system includes a first storage unit and a second storage unit that correspond to a first storage unit and a second storage unit in the first storage system, respectively; and
  in response to determining during the failover that the second storage unit is operable in the first storage system while the first storage unit in the first storage system is inoperable, initiating a resynchronization to copy updates from the second storage unit of the second storage system, mirroring the second storage unit of the first storage system to the second storage unit of the first storage system, while I/O requests are being redirected to the second storage system.

17. The method of claim 16, wherein the synchronization of the data between the first storage system and the second storage system are performed in synchronous copy mode and wherein the copying of the updates during the resynchronization while I/O requests are being redirected to the second storage system are performed in asynchronous copy mode.

18. The method of claim 16,
  wherein the determining that the first storage unit is inoperable comprises:
    initiating a point-in-time copy of the first storage unit of the first storage system; and
    determining that the point-in-time copy of the first storage unit failed, wherein the first storage unit is determined to be inoperable in response to determining that the point-in-time copy of the first storage unit failed;
  wherein the determining that the second storage unit is operable comprising:
    initiating a point-in-time copy of the second storage unit of the first storage system; and
    determining that the point-in-time copy of the second storage unit succeeded, wherein the second storage unit is determined to be operable in response to determining that the point-in-time copy of the second storage unit succeeded.

19. The method of claim 18, further comprising:
  initiating a soft fence state for the first storage system to prevent I/O access to the first and the second storage units at the first storage system in response to the failover event, wherein point-in-time copies are initiated with a command having a parameter to allow point-in-time copy operations to proceed during the soft fence state of the first storage system.

20. The method of claim 16, wherein the resynchronization comprises a first resynchronization, further comprising:
  issuing a health query to the first storage system to determine whether the first storage system is fully operable, wherein both the first and second storage units of the first storage system are operable when the first storage system is fully operable; and
  initiating a second resynchronization to copy updates to the first storage unit of the second storage system to the first storage unit of the first storage system in response to determining that the response to the health query indicates the first storage system is fully operable.

21. The method of claim 20, wherein the first storage units comprise first volumes of the first and second storage systems and wherein the second storage units comprise second volumes of the first and second storage systems, wherein the first volume determined to be inoperable includes a subset of tracks experiencing data loss, wherein the second resynchronization further performs in response to the health query indicating that the first storage system is fully operable:
  copying a subset of tracks in the first volume of the second storage system to a corresponding subset of tracks in the first volume in the first storage system, wherein tracks in the first volume in the first storage system not experiencing data loss and not corresponding to tracks in the first volume in the second storage system that are updated while I/O requests are being redirected to the second storage system are not subject to the second resynchronization.

\* \* \* \* \*